United States Patent
Li et al.

(10) Patent No.: US 11,257,055 B2
(45) Date of Patent: Feb. 22, 2022

(54) MOBILE PAYMENT SYSTEMS AND METHODS FOR VENDING MACHINES

(71) Applicant: MASTERCARD ASIA/PACIFIC PTE. LTD., Singapore (SG)

(72) Inventors: Jiaming Li, Singapore (SG); Shiying Lian, Singapore (SG); Zunhua Wang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 636 days.

(21) Appl. No.: 15/950,818

(22) Filed: Apr. 11, 2018

(65) Prior Publication Data
US 2018/0300702 A1    Oct. 18, 2018

(30) Foreign Application Priority Data
Apr. 12, 2017    (SG) .......................... 10201703018X

(51) Int. Cl.
*G06Q 20/18*    (2012.01)
*G06Q 20/40*    (2012.01)
(Continued)

(52) U.S. Cl.
CPC ............. *G06Q 20/18* (2013.01); *G06Q 20/02* (2013.01); *G06Q 20/202* (2013.01);
(Continued)

(58) Field of Classification Search
CPC ........ G06Q 20/22; G06Q 20/40; G06Q 20/18; H04L 29/06
See application file for complete search history.

(56) References Cited

U.S. PATENT DOCUMENTS 8,666,874 B2 *   3/2014   Breitenbach .............. G07F 5/18
                                                                                      705/37
9,153,089 B1 *   10/2015   Hewett ................ G06Q 20/322
(Continued)

FOREIGN PATENT DOCUMENTS

DE          19961793 C1       1/2001
EP           1513120 A2        3/2005
(Continued)

OTHER PUBLICATIONS

W. Zhang and X. L. Zhang, "Design and Implementation of Automatic Vending Machine Based on the Short Massage Payment," 2010 6th International Conference on Wireless Communications Networking and Mobile Computing (WiCOM), 2010, pp. 1-4, doi: 10.1109/WICOM.2010.5600192. (Year: 2010).*
(Continued)

*Primary Examiner* — Oluseye Iwarere
(74) *Attorney, Agent, or Firm* — Talem IP Law, LLP

(57) ABSTRACT

Mobile payment systems and methods for vending machines can include a mobile payment system comprising: a vending server module that is configured to: generate a unique session identifier in response to receipt of a unique machine identifier associated with a vending machine and a price of a product to be purchased from the vending machine; receive a mobile payment request from a mobile device, the mobile payment request comprising payment credentials, the unique session identifier, the unique machine identifier and the price of the product; and generate a vending authorization message on a condition that the mobile payment request is approved, the vending authorization message comprising instructions for the vending machine to dispense the product.

20 Claims, 7 Drawing Sheets

(51) Int. Cl.
  *G06Q 20/32* (2012.01)
  *G06Q 20/20* (2012.01)
  *G06Q 20/42* (2012.01)
  *G06Q 20/02* (2012.01)
  *G07F 9/00* (2006.01)

(52) U.S. Cl.
  CPC ......... *G06Q 20/322* (2013.01); *G06Q 20/327* (2013.01); *G06Q 20/3276* (2013.01); *G06Q 20/3278* (2013.01); *G06Q 20/40* (2013.01); *G06Q 20/425* (2013.01); *G07F 9/001* (2020.05); *G07F 9/002* (2020.05)

(56) References Cited

U.S. PATENT DOCUMENTS

| | | | |
|---|---|---|---|
| 9,547,859 B2* | 1/2017 | Patel | G06Q 20/3821 |
| 9,603,019 B1* | 3/2017 | Ramatchandirane | H04W 12/001 |
| 10,210,501 B2* | 2/2019 | Low | G06Q 20/327 |
| 10,304,057 B1* | 5/2019 | Powell | G06Q 20/322 |
| 10,475,003 B2* | 11/2019 | Metral | G06Q 20/3278 |
| 2002/0128932 A1* | 9/2002 | Yung | G06Q 10/087 705/26.1 |
| 2003/0023509 A1 | 1/2003 | Rammig | |
| 2005/0102233 A1 | 5/2005 | Park et al. | |
| 2006/0258397 A1* | 11/2006 | Kaplan | H04M 15/00 455/556.1 |
| 2009/0157220 A1* | 6/2009 | Walker | G07F 9/026 700/232 |
| 2012/0029691 A1* | 2/2012 | Mockus | H04W 4/06 700/232 |
| 2012/0173351 A1* | 7/2012 | Hanson | G06Q 20/12 705/17 |
| 2013/0041776 A1* | 2/2013 | Schunemann | G06Q 20/18 705/26.41 |
| 2013/0211900 A1* | 8/2013 | Dessert | G06Q 10/06 705/14.27 |
| 2014/0032412 A1* | 1/2014 | Park | G06Q 20/18 705/44 |
| 2014/0032413 A1* | 1/2014 | Low | G06Q 20/18 705/44 |
| 2014/0074714 A1* | 3/2014 | Melone | G06Q 20/00 705/44 |
| 2014/0136354 A1* | 5/2014 | Emery | G06Q 20/322 705/21 |
| 2014/0143137 A1* | 5/2014 | Carlson | G06Q 20/02 705/39 |
| 2014/0180852 A1* | 6/2014 | Kamat | G06Q 20/02 705/16 |
| 2014/0263618 A1* | 9/2014 | McCarthy | G06Q 40/02 235/379 |
| 2014/0309770 A1* | 10/2014 | Signorelli | G06Q 20/20 700/232 |
| 2015/0100152 A1* | 4/2015 | Barragan Trevino | G06Q 20/322 700/232 |
| 2015/0235202 A1* | 8/2015 | Zabala | G06Q 20/327 700/232 |
| 2015/0278810 A1* | 10/2015 | Ramatchandirane | G06Q 20/401 705/16 |
| 2015/0287030 A1* | 10/2015 | Sagady | G06Q 20/3226 705/71 |
| 2015/0339621 A1* | 11/2015 | Hewett | G06Q 10/087 705/28 |
| 2016/0078421 A1* | 3/2016 | Barragan Trevino | G07F 9/10 705/17 |
| 2016/0335620 A1* | 11/2016 | Lyons | G07F 7/00 |
| 2017/0076265 A1* | 3/2017 | Royyuru | G06Q 20/204 |
| 2017/0076274 A1* | 3/2017 | Royyuru | G06Q 20/20 |
| 2017/0193479 A1* | 7/2017 | Kamat | G06Q 20/20 |
| 2017/0302641 A1* | 10/2017 | Ramatchandirane | H04L 63/0421 |
| 2017/0330164 A1* | 11/2017 | Suelberg | G06Q 10/087 |
| 2017/0364886 A1* | 12/2017 | Barragan Trevino | G06Q 20/322 |
| 2018/0121912 A1* | 5/2018 | Morales | G06Q 20/00 |
| 2018/0137489 A1* | 5/2018 | Chang | G06Q 20/202 |
| 2018/0240096 A1* | 8/2018 | Patel | G06Q 20/322 |
| 2018/0308079 A1* | 10/2018 | Zong | G06Q 20/18 |
| 2019/0114605 A1* | 4/2019 | Valencia | G07F 9/002 |
| 2019/0215402 A1* | 7/2019 | Kaplan | G06Q 20/32 |
| 2019/0251562 A1* | 8/2019 | Dabiri | G06Q 50/01 |
| 2019/0385137 A1* | 12/2019 | Barragan Trevino | G05B 15/02 |
| 2020/0034808 A1* | 1/2020 | Kamat | G06Q 20/20 |

FOREIGN PATENT DOCUMENTS

| | | |
|---|---|---|
| EP | 2128809 A1 | 12/2009 |
| WO | 2010012362 A1 | 2/2010 |

OTHER PUBLICATIONS

V. P. Semenov, V. V. Chernokulsky and N. V. Razmochaeva, "The cashless payment device for vending machines—Import substitution in the sphere of vending," 2017 International Conference "Quality Management,Transport and Information Security, Information Technologies" (IT&QM&IS), 2017, pp. 798-801 (Year: 2017).*

International Search Report and Written Opinion Issued in International Application No. PCT/SG2018/050084, dated May 3, 2018, 12 pages.

* cited by examiner

MOBILE PAYMENT SYSTEMS AND METHODS FOR VENDING MACHINES

FIELD OF INVENTION

The present invention relates broadly, but not exclusively, to mobile payment systems and methods for vending machines.

BACKGROUND

A vending machine is a machine that automatically dispenses products (such as food, beverages, and newspapers) after a customer inserts currency or credit into the machine. Typically, a customer approaches the vending machine, decides what product to purchase, inserts payment (e.g. coins, banknotes), and inputs the selection into the vending machine using a user interface (e.g. buttons, keypad, touch screen). The vending machine will dispense the chosen product to the customer.

As cashless societies (i.e. economies where financial transactions are mostly conducted with electronic payments such as payment cards or mobile payments instead of physical banknotes or coins) are becoming more prevalent, customers tend to carry less physical banknotes or coins with them. As such, these customers face difficulties when they wish to purchase products from traditional vending machines that only accept physical banknotes or coins. These traditional vending machines are not able to accept electronic payments since they are "stand-alone" units that are not connected to an electronic payment network.

A need therefore exists to provide mobile payment systems and methods for vending machines that seek to address at least some of the above problems.

SUMMARY

According to a first aspect, there is provided a mobile payment system for vending machines, comprising: a vending server module that is configured to: generate a unique session identifier in response to receipt of a unique machine identifier associated with a vending machine and a price of a product to be purchased from the vending machine; receive a mobile payment request from a mobile device, the mobile payment request comprising payment credentials, the unique session identifier, the unique machine identifier and the price of the product; and generate a vending authorization message on a condition that the mobile payment request is approved, the vending authorization message comprising instructions for the vending machine to dispense the product.

According to a second aspect, there is provided a mobile payment method for vending machines, comprising: generating, at a vending server module, a unique session identifier in response to receipt of a unique machine identifier associated with a vending machine and a price of a product to be purchased from the vending machine; receiving, at the vending server module, a mobile payment request from a mobile device, the mobile payment request comprising payment credentials, the unique session identifier, the unique machine identifier and the price of the product; and generating, at the vending server module, a vending authorization message on a condition that the mobile payment request is approved, the vending authorization message comprising instructions for the vending machine to dispense the product.

According to a third aspect, there is provided a vending machine comprising: a mobile payment module that is configured to: transmit, to a vending server module, a unique machine identifier associated with the vending machine and a price of a product to be purchased from the vending machine in response to a product purchase request that is received at the vending machine; receive, from the vending server module, a unique session identifier that is associated with the product purchase request; and subsequently receive, from the vending server module, a vending authorization message that corresponds to an approved mobile payment request that is linked to the unique session identifier, wherein the vending machine is configured to dispense the product to be purchased in response to receipt of the vending authorization message.

According to a fourth aspect, there is provided a mobile payment method for a vending machine, comprising: transmitting, from a mobile payment module of the vending machine to a vending server module, a unique machine identifier associated with the vending machine and a price of a product to be purchased from the vending machine in response to a product purchase request that is received at the vending machine; receiving, at the mobile payment module from the vending server module, a unique session identifier that is associated with the product purchase request; and subsequently receiving, at the mobile payment module from the vending server module, a vending authorization message that corresponds to an approved mobile payment request that is linked to the unique session identifier, wherein the vending machine is configured to dispense the product to be purchased in response to receipt of the vending authorization message.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

DETAILED DESCRIPTION

Figure 1:
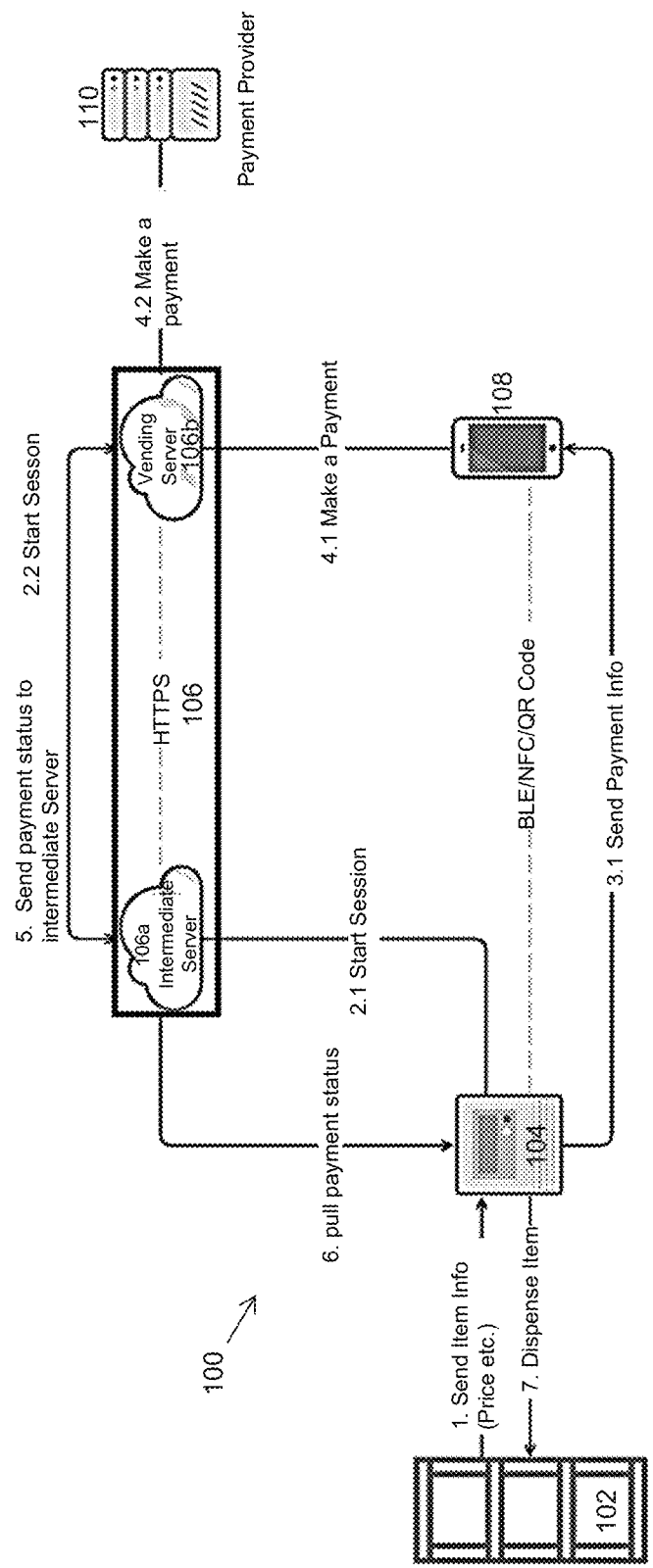
FIG. 1 is a schematic diagram of a mobile payment network for vending machines, according to an example embodiment.

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Embodiments relate to mobile payment systems and methods for vending machines, and also relate to vending machines that can accept mobile payments instead of (or in addition to) physical banknotes, coins or payment cards. In this context, mobile payment refers to payment services operated under financial regulation and performed from or via a mobile device (a portable computing device such as a smartphone or tablet computer). Common mobile payment mechanisms include, but are not limited to: (i) Bluetooth Low Energy (BLE), (ii) contactless Near Field Communication (NFC) and (iii) QR codes.

FIG. 1 is a schematic diagram of a mobile payment network 100 for vending machines, according to an example embodiment. The mobile payment network 100 includes one or more vending machines (only one vending machine 102 is shown in FIG. 1), a mobile payment module 104, a vending server module 106 and a payment provider server 110.

The vending machine 102 is substantially similar to standard vending machines known in the art in that the vending machine 102 can dispense a product (e.g. physical goods or services) that is selected by a customer via a user interface after payment for the product has been made. The main difference between vending machine 102 and standard vending machines known in the art is that the vending machine 102 is able to accept mobile payments from a mobile device 108. The mobile payment module 104 may be in the form of a wireless adapter (i.e. dongle) that can be used provide connectivity between the vending machine 102 and the vending server module 106. The mobile payment module 104 is shown in FIG. 1 to be external to the vending machine 102 but it will be appreciated that the mobile payment module 104 can be disposed within the vending machine 102 or integrated with the vending machine 102 as an internal component of the vending machine 102.

The vending server module 106 can be implemented as a single server module, or implemented as two separate server modules—an intermediate server 106a and a vending server 106b—as shown in FIG. 1. In the latter implementation, the intermediate server 106a is in communication with the mobile payment module 104 while the intermediate server 106a is in communication with the vending server 106b via a secure communication protocol (e.g. HTTPS).

If the vending server module 106 is implemented as a single module, the vending server module 106 is in communication with the payment provider server 110. On the other hand, if the vending server module 106 is implemented as two separate servers, the vending server 106b is in communication with the payment provider server 110. The payment provider server 110 is administered by a mobile payment provider and is configured to allow processing of mobile payments as known in the art.

With reference to FIG. 1, a customer approaches the vending machine 102 and selects a product to purchase. At step 1, the vending machine 102 sends a vend request to the mobile payment module 104. The vend request includes data corresponding to a price of the product that the customer wishes to purchase and, optionally, information related to the product (e.g. name, model, stock keeping unit (SKU) code, etc.). At step 2.1, the mobile payment module 104 sends the following information to the intermediate server 106a to start a session—(i) a unique machine identifier associated with the vending machine 102 or the mobile payment module 104, (ii) the price of the product, optionally (iii) information related to the product and optionally (iv) supplementary information. The supplementary information includes: a timestamp corresponding to the customer's product purchase request, random data for facilitate encryption/security, and a sequence number to prevent replay attacks. Optionally, a "smart chip" which is a Java card is installed in the vending machine 102. The "smart chip" enables secure data transfer between the vending machine 102 and the intermediate server 106a by providing cryptographic keys and other security elements.

At step 2.2, the intermediate server 106a relays some or all of the above-mentioned information (i.e. the machine identifier, the price of the product, the information related to the product, and the supplementary information) to the vending server 106b. Upon receipt of the information, the vending server 106b generates a unique session identifier associated with the session. The unique session identifier is transmitted to the mobile payment module 104 via the intermediate server 106a.

The vending machine 102 includes appropriate hardware to transmit one or more of the following information to the mobile device 108 as per step 3.1—(i) the machine identifier, (ii) the price of the product, (iii) the unique session identifier, (iv) the information related to the product, and (v) the supplementary information. The information can be transmitted to the mobile device 108 via the following methods: (i) Bluetooth Low Energy (BLE), (ii) contactless Near Field Communication (NFC) and (iii) QR codes. Accordingly, the appropriate hardware of the vending machine 102 includes BLE and NFC transceivers and display modules/screens that can display QR codes. The information transmitted from the vending machine 102 to the mobile device 108 can be static or dynamic. For example, the data encoded on the QR code can be static or dynamic.

At step 4.1, the customer uses the mobile device 108 to make a payment by connecting to the vending server 106b. The mobile device 108 transmits relevant payment credentials to the vending server 106b for mobile payment, together with the unique session identifier, the unique machine identifier and/or the price of the product.

At step 4.2, the vending server 106b transmits the payment credentials to the payment provider server 110 for approval of the mobile payment request. The payment provider server 110 validates the payment credentials and if the mobile payment request is authorized, a mobile payment approval message is transmitted to the vending server 106b. On the other hand, if the mobile payment request is declined, a mobile payment decline message is transmitted to the vending server 106b.

At step 5, the vending server 106b transmits a payment status to the intermediate server 106a. The payment status can be in the form of the mobile payment approval message or mobile payment decline message, depending whether the mobile payment was approved or declined.

At step 6, the mobile payment module 104 polls the intermediate server 106a at regular intervals for the payment status. Alternatively, the mobile payment module 104 keeps the connection with the intermediate server 106a open and waits for a response from the intermediate server 106a (i.e. the intermediate server 106a will transmit the payment status to the mobile payment module 104).

At step 7, if the mobile payment module 104 receives a payment status indicating that payment for the product has been made (i.e. a mobile payment approval message was received), the vending machine 102 dispenses the product.

Figure 2:
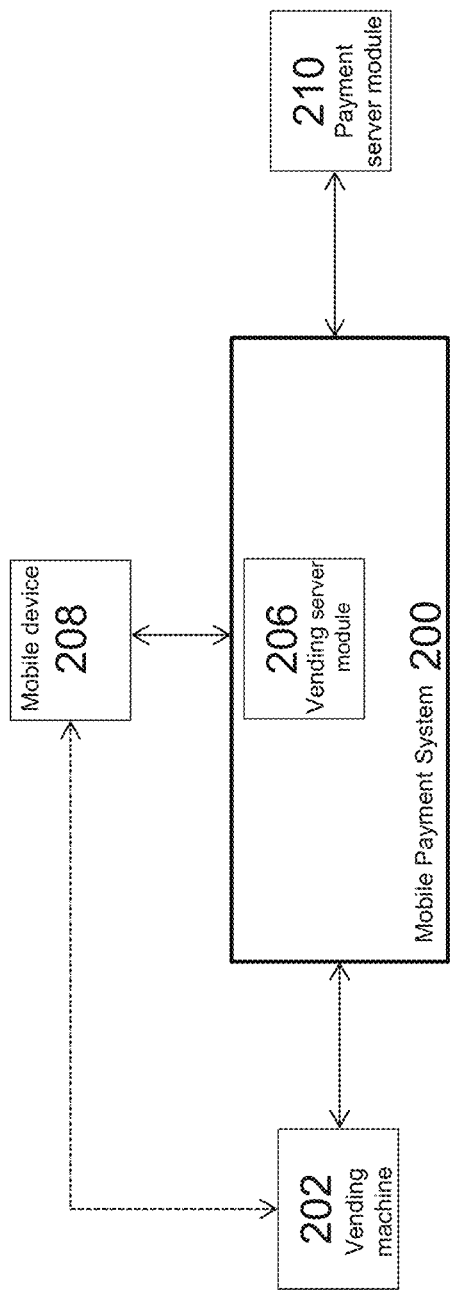
FIG. 2 is a schematic diagram of a mobile payment system for vending machines, according to an example embodiment.

FIG. 2 is a schematic diagram of a mobile payment system 200 for vending machines, according to an example embodiment. The mobile payment system 200 includes a vending server module 206 that is in direct or indirect (e.g. via an intermediate node/relay module) communication with (i) a vending machine 202, (ii) a payment server module 210, and (iii) a mobile device 208.

The vending server module 206 is configured to generate a unique session identifier in response to receipt of a unique machine identifier associated with the vending machine 202 and a price of a product to be purchased from the vending machine 202. The vending server module 206 is further configured to transmit the generated unique session identifier to the vending machine 202.

The vending machine 202 is configured to transmit the unique session identifier, the unique machine identifier and the price of the product to the mobile device 208 such that the mobile device 208 can initiate a mobile payment request.

The vending server module 206 is configured to receive the mobile payment request from the mobile device 208. The mobile payment request includes payment credentials, the unique session identifier, the unique machine identifier and the price of the product. The unique session identifier is associated with a product purchase request that is received at the vending machine 202 such that the mobile payment request that is subsequently received at the vending server module 206 from the mobile device 208 can be linked to the product purchase request.

The vending server module 206 is configured to transmit the payment credentials to the payment server module 210 for approval of the mobile payment request. The payment server module 210 validates the mobile payment request and if the mobile payment request is approved, a payment approval message is generated and subsequently transmitted to the vending server module 206. The vending server module 206 is further configured to generate a vending authorization message on a condition that the mobile payment request is approved. The vending authorization message includes instructions for the vending machine 202 to dispense the product.

The vending server module 206 is further configured to receive a vending success message from the vending machine 202 on a condition that the vending machine 202 dispenses the product. The vending success message comprises instructions to release funds corresponding to the price of the product. For example, the funds can be released to a merchant of the product or an operator of the vending machine 202.

In an implementation, the vending server module 206 may be further configured to receive, from the vending machine 202, information of the product to be purchased and a timestamp corresponding to the product purchase request. At the same time, the vending server module 206 may be further configured to receive, from the mobile device 208, the mobile payment request that further includes the information of the product to be purchased and the timestamp corresponding to the product purchase request. In this manner, the vending server module 206 can generate the vending authorization message on a further condition that the information of the product to be purchased and the timestamp corresponding to the product purchase request received from the vending machine match the same received from the mobile device. This cross-checking is to prevent unintentional payment for a wrong item or at a wrong time.

Figure 3:
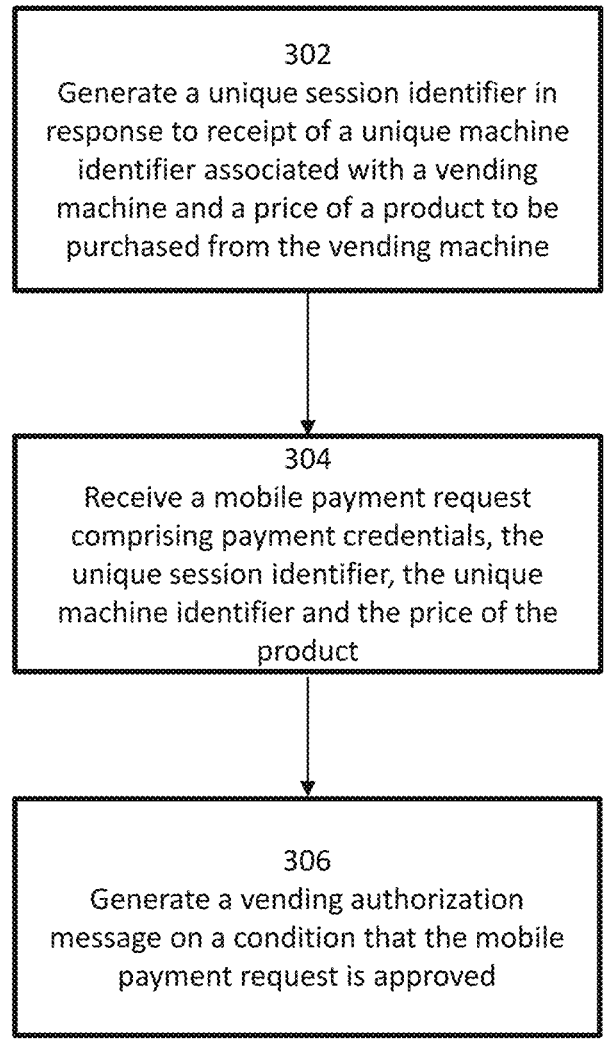
FIG. 3 is a flow chart illustrating a mobile payment method for vending machines, according to an example embodiment.

FIG. 3 is a flow chart illustrating a mobile payment method 300 for vending machines, according to an example embodiment. At step 302, a vending server module (similar to the vending server module 206) generates a unique session identifier in response to receipt of a unique machine identifier associated with a vending machine and a price of a product to be purchased from the vending machine.

At step 304, the vending server module receives a mobile payment request from a mobile device. The mobile payment request includes payment credentials, the unique session identifier, the unique machine identifier and the price of the product.

At step 306, the vending server module generates a vending authorization message on a condition that the mobile payment request is approved. The vending authorization message includes instructions for the vending machine to dispense the product.

Subsequent to step 302, the method 300 may further include the step of transmitting the generated unique session identifier from the vending server module to the vending machine. Thereafter, the unique session identifier, the unique machine identifier and the price of the product are transmitted from the vending machine to the mobile device such that the mobile device can initiate the mobile payment request (prior to step 304).

The unique session identifier, the unique machine identifier and the price of the product may be transmitted from the vending machine to the mobile device via Bluetooth Low Energy (BLE) or Near Field Communication (NFC). Alternatively or in addition, the unique session identifier, the unique machine identifier and the price of the product can be encoded on a machine-readable code (e.g. a QR-code) and the machine-readable code can be displayed by a display module of the vending machine.

Prior to step 302, the method 300 may further include transmitting the unique machine identifier and the price of the product from the vending machine to the vending server module in response to a product purchase request that is received at the vending machine.

The unique session identifier is associated with the product purchase request that is received at the vending machine such that the mobile payment request that is subsequently received at the vending server module from the mobile device (i.e. at step 304) can be linked to the product purchase request.

In an implementation, the method 300 may further include the following three sub-steps. The first sub-step involves receiving, at the vending server module from the vending machine, information of the product to be purchased and a timestamp corresponding to the product purchase request. The second sub-step involves receiving, at the vending server module from the mobile device, the mobile payment request further comprising the information of the product to be purchased and the timestamp corresponding to the product purchase request. The third sub-step involves generating, at the vending server module, the vending authorization message on a further condition that the information of the product to be purchased and the timestamp corresponding to the product purchase request that are received from the vending machine match the same that are received from the mobile device.

Subsequent to step 304, the method 300 may further include the step of transmitting the payment credentials from the vending server module to a payment server module (similar to the payment server module 210) for approval of the mobile payment request. Assuming that the mobile payment request is approved, a payment approval message is generated at the payment server module and the payment approval message is transmitted to the vending server module. The vending server module receives the payment approval message from the payment server module and the vending server module can execute step 306, i.e. generating the vending authorization message that includes instructions for the vending machine to dispense the product. The vending machine can dispense the product upon receipt of the vending authorization message from the vending server module.

After the vending machine dispenses the product, the method 300 may further include the step of transmitting, from the vending machine to the vending server module, a vending success message. The vending success message may include instructions to release funds corresponding to the price of the product. For example, the funds can be released to a merchant of the product or an operator of the vending machine.

According to an embodiment, there is provided a vending machine that includes a mobile payment module. The mobile payment module is configured to transmit, to a vending server module, a unique machine identifier associated with the vending machine and a price of a product to be purchased from the vending machine in response to a product purchase request that is received at the vending machine. The mobile payment module is further configured to: (i) receive, from the vending server module, a unique session identifier that is associated with the product purchase request; and subsequently (ii) receive, from the vending server module, a vending authorization message that corresponds to an approved mobile payment request that is linked to the unique session identifier. The vending machine is configured to dispense the product to be purchased in response to receipt of the vending authorization message.

The mobile payment module may be further configured to transmit the unique session identifier, the unique machine identifier and the price of the product to a mobile device such that the mobile device can initiate a mobile payment request.

The unique session identifier, the unique machine identifier and the price of the product can be transmitted to the mobile device via Bluetooth Low Energy (BLE) or Near Field Communication (NFC). Alternatively or in addition, the vending machine may further include a display module and the mobile payment module may be further configured to cause the display module to display a machine-readable code. The machine-readable code includes the unique session identifier, the unique machine identifier and/or the price of the product encoded thereon. The mobile device can have a code reader to receive and decode the data encoded on the machine-readable code (e.g. a QR-code). The machine-readable code may be static or dynamic.

The mobile payment module may be further configured to transmit, to the vending server module, a vending success message on a condition that the vending machine dispenses the product. The vending success message includes instructions to release funds corresponding to the price of the product.

Figure 4:
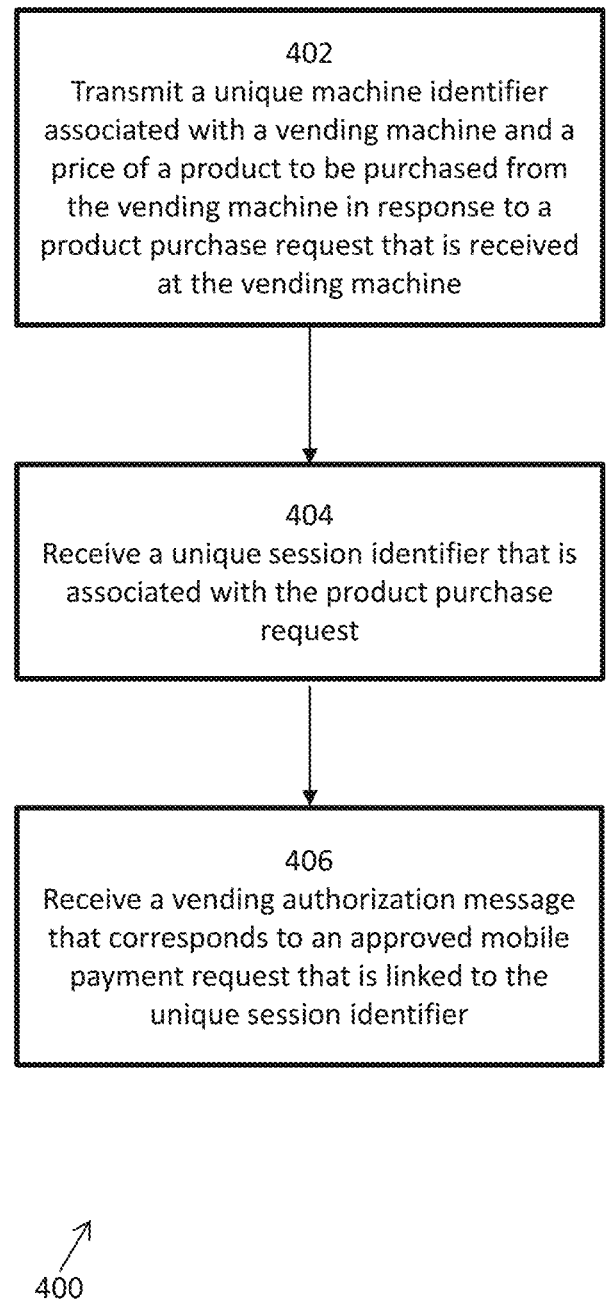
FIG. 4 is a flow chart illustrating a mobile payment method for a vending machine, according to an example embodiment.

FIG. 4 is a flow chart illustrating a mobile payment method 400 for a vending machine, according to an example embodiment. Step 402 involves transmitting, from a mobile payment module of the vending machine to a vending server module, a unique machine identifier associated with the vending machine and a price of a product to be purchased from the vending machine in response to a product purchase request that is received at the vending machine. Step 404 involves receiving, at the mobile payment module from the vending server module, a unique session identifier that is associated with the product purchase request. Subsequently, step 406 involves receiving, at the mobile payment module from the vending server module, a vending authorization message that corresponds to an approved mobile payment request that is linked to the unique session identifier. The vending machine is configured to dispense the product to be purchased in response to receipt of the vending authorization message.

The method 400 may further include the step of transmitting the unique session identifier, the unique machine identifier and the price of the product from the mobile payment module to a mobile device such that the mobile device can initiate a mobile payment request. The unique session identifier, the unique machine identifier and the price of the product can be transmitted to the mobile device via Bluetooth Low Energy (BLE) or Near Field Communication (NFC). The method 400 may further include displaying, by a display module of the vending machine, a machine-readable code comprising the unique session identifier, the unique machine identifier and the price of the product encoded thereon.

The method 400 may further include transmitting, from the mobile payment module to the vending server module, a vending success message on a condition that the vending machine dispenses the product. The vending success message includes instructions to release funds corresponding to the price of the product.

Figure 5:
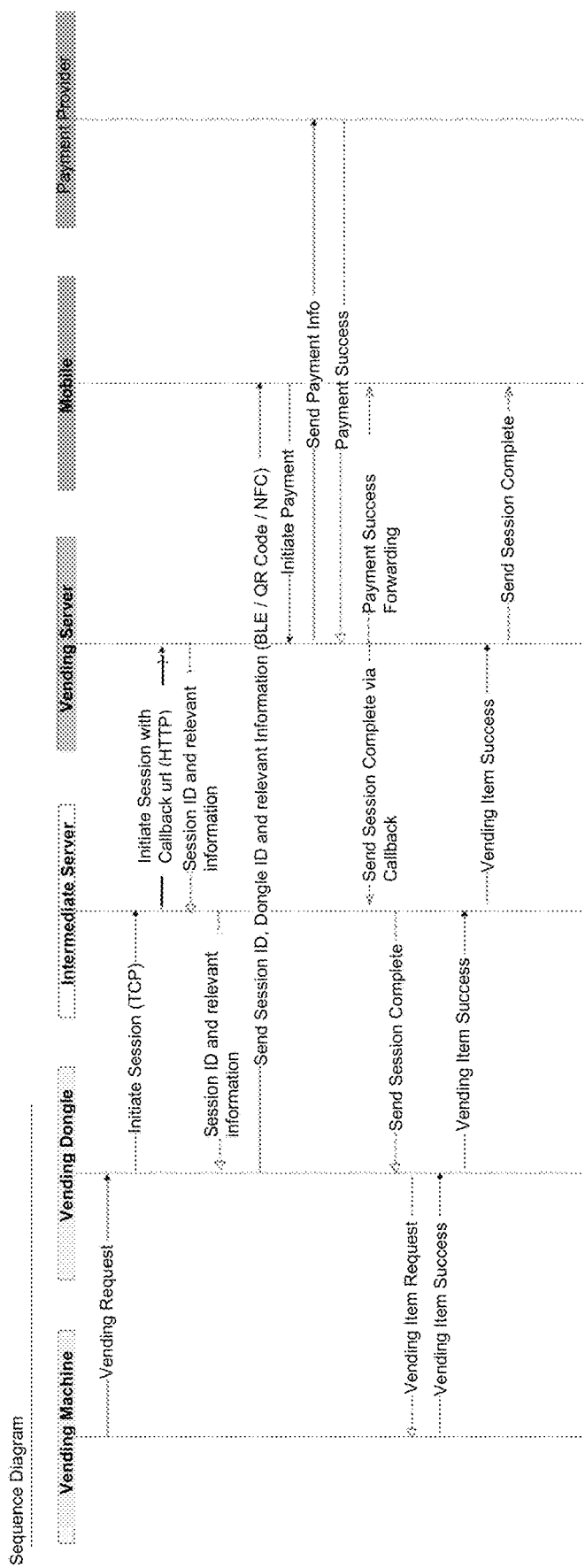
FIG. 5 is a sequence diagram illustrating various steps of a mobile payment method for vending machines wherein the sequence starts from a vending machine, according to an example embodiment.

FIG. 5 is a sequence diagram illustrating various steps of a mobile payment method for vending machines wherein the sequence starts from a vending machine, according to an example embodiment. The vending machine transmits a vending request to a vending dongle (i.e. a wireless adaptor). The dongle then initiates a session with an intermediate server via Transmission Control Protocol (TCP). The vending dongle is substantially similar to the above-mentioned mobile payment module.

In turn, the intermediate server initiates the session with a vending server via Hypertext Transfer Protocol—Secure (HTTPS). The parameters of the session initiation request include one or more of: a machine ID uniquely associated with the vending machine or dongle, a price of an item that a customer wishes to purchase at the vending machine, information of the item (e.g. item name), and a callback URL to signal that the session in complete (unique for each session).

In an implementation, it may be optional to include the information of the item (e.g. item name) as one of the parameters of the session initiation request. This is because the vending machine can be configured to be "locked" (i.e. unable to accept any further product purchase requests) until the current session is complete. Accordingly, the price of the item (or total price of the items) is sufficient for the vending server to handle the product purchase request. In other words, the vending server does not need the identity of the item; the product is dispensed as long as the correct payment amount is made.

In response to the session initiation request, the vending server returns a session ID that is uniquely associated with the session and other relevant information (e.g. session status such as "Initialized"). The session ID and other relevant information are then transmitted from the vending server to the intermediate server.

The dongle sends the session ID, machine ID and other relevant information (e.g. item price, information for debugging or auditing such as timestamp) to the mobile device via BLE, NFC or QR-code so that the mobile device can pair with (link to) the initiated session.

The customer can then use the mobile device to initiate a mobile payment request by transmitting payment information (e.g. payment credentials), the unique session identifier, the unique machine identifier and the price of the product to the vending server. The vending server relays the payment credentials and other relevant payment information to a payment provider server for approval/authorization of the mobile payment request. If the mobile payment request is approved/authorized, a payment success message is returned to the vending server.

The vending server relays the payment success message to the mobile device to inform the user that the mobile payment that been approved. The vending server also sends a session complete command to the intermediate server via the callback URL. The intermediate server then sends a session complete message to the dongle. The dongle can pull the session status from the vending server at the same time. In turn, the dongle sends a vending authorization message to the vending machine to dispense the product.

In response to the vending authorization message, the vending machine dispenses the product and returns a vending success message to the dongle. The dongle relays the vending success message to the intermediate server, which in turn relays the vending success message to the vending server. The vending server then transmits a session complete message to the mobile device to inform the user that the product has been dispensed. The vending success message may include instructions to the payment provider to release funds corresponding to the price of the product to a merchant of the product or an operator of the vending machine.

Figure 6:
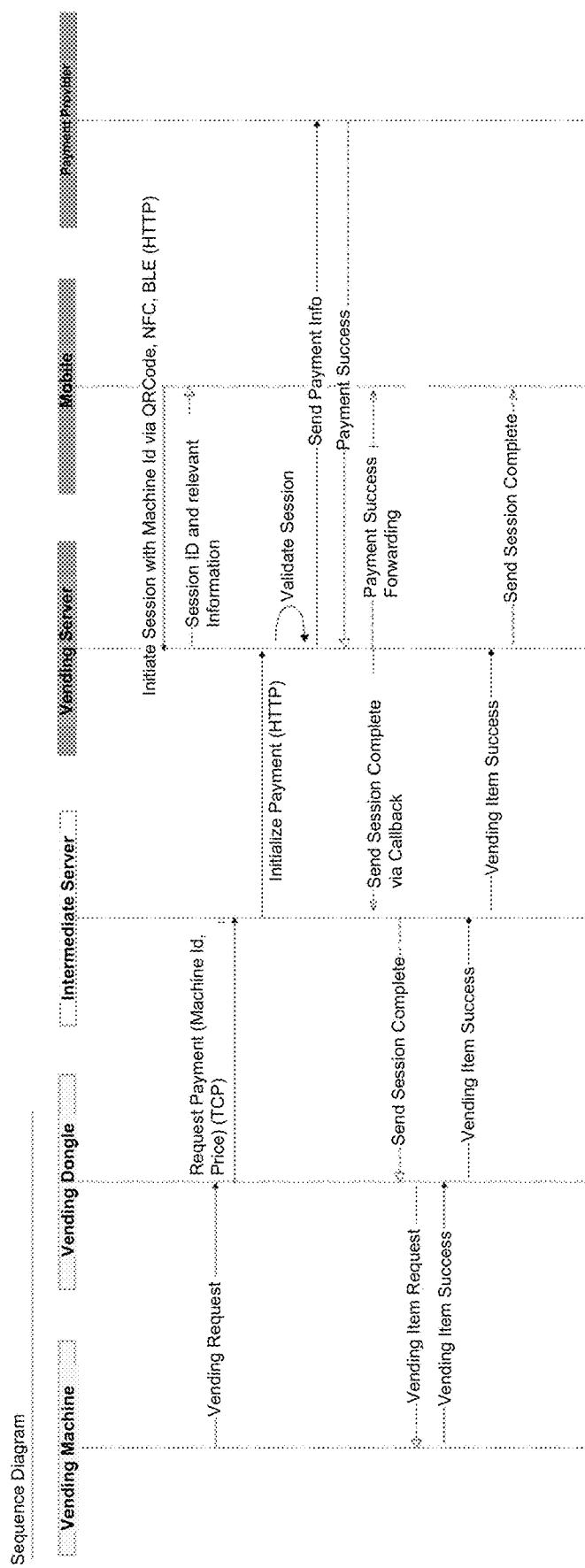
FIG. 6 is a sequence diagram illustrating various steps of a mobile payment method for vending machines wherein the sequence starts from a mobile device, according to an example embodiment.

FIG. 6 is a sequence diagram illustrating various steps of a mobile payment method for vending machines wherein the sequence starts from a mobile device, according to an example embodiment. A customer wishes to purchase a product from a vending machine. The customer uses the mobile device to obtain a machine ID that is uniquely associated with the vending machine (e.g. via a QR code that is displayed at the vending machine or via a NFC or BLE connection). The mobile device then initiates a session with a vending server and transmits the machine ID to the vending server. In response to the session initiation request, the vending server returns a session ID that is uniquely associated with the session and other relevant information (e.g. session status). The vending machine transmits a vending request to a vending dongle (i.e. a wireless adaptor). The dongle then transmits a payment request to an intermediate server via Transmission Control Protocol (TCP). The payment request includes the machine ID and price of the product.

In turn, the intermediate server initializes payment with the vending server via Hypertext Transfer Protocol—Secure (HTTPS). The vending server retrieves the session created at the above step based on the Machine ID and if the session is successfully retrieved, the vending server transmits payment information (e.g. payment credentials) to a payment provider server for approval/authorization of the mobile payment request. If the mobile payment request is approved/authorized, a payment success message is returned to the vending server.

The vending server relays the payment success message to the mobile device to inform the user that the mobile payment that been approved. The vending server also sends a session complete command to the intermediate server via the callback URL. The intermediate server then sends a session complete message to the dongle. In turn, the dongle sends a vending authorization message to the vending machine to dispense the product.

In response to the vending authorization message, the vending machine dispenses the product and returns a vending success message to the dongle. The dongle relays the vending success message to the intermediate server, which in turn relays the vending success message to the vending server. The vending server then transmits a session complete message to the mobile device to inform the user that the product has been dispensed. The vending success message may include instructions to the payment provider to release funds corresponding to the price of the product to a merchant of the product or an operator of the vending machine.

Figure 7:
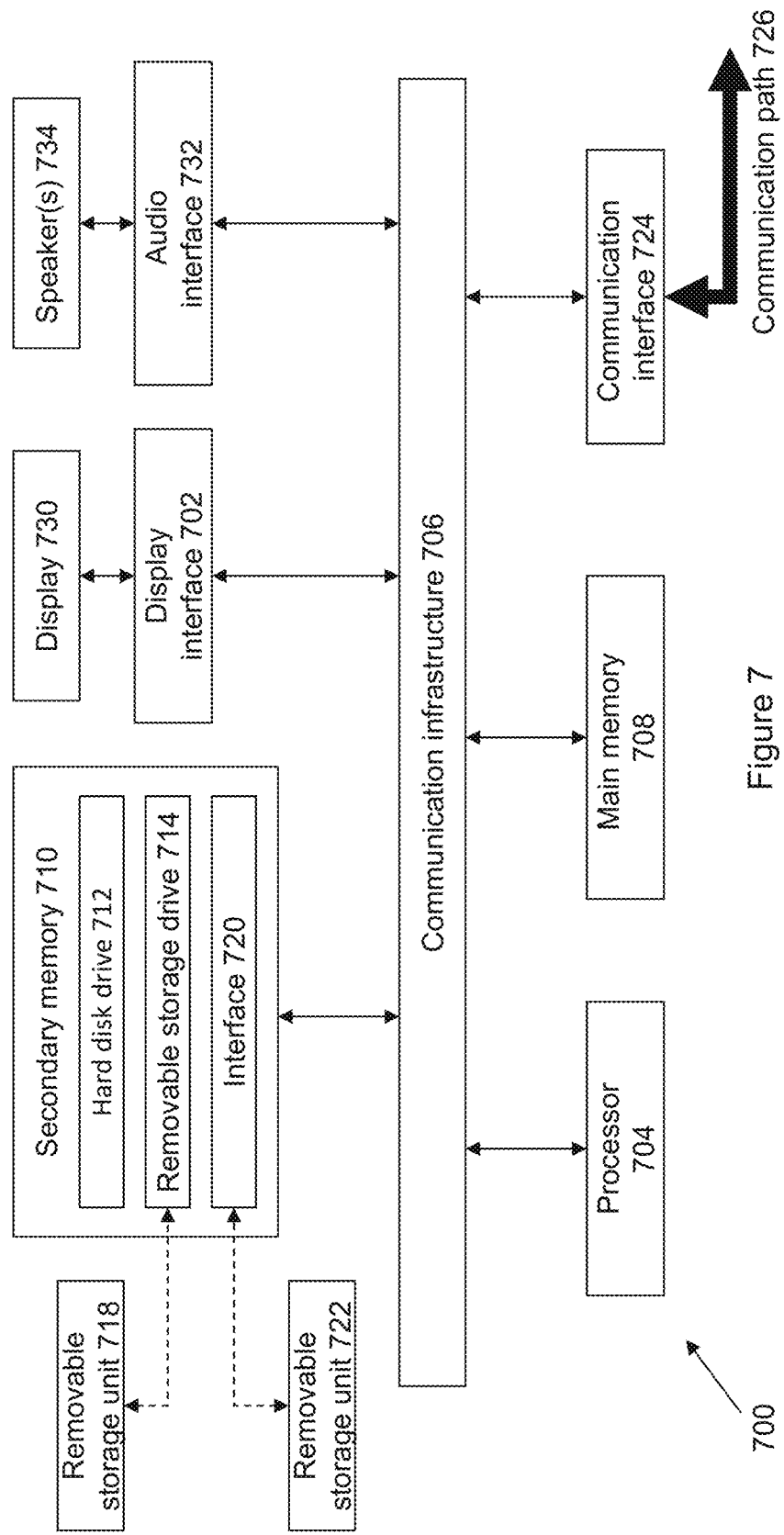
FIG. 7 shows a schematic diagram of a computer system suitable for use in executing one or more steps of the mobile payment method for vending machines according to example embodiments.

FIG. 7 shows a schematic diagram of a computer device/system 700 suitable for use in executing one or more steps of the above-described mobile payment methods for vending machines. One or more such computing devices 700 may be used to execute the above-described methods. In addition, one or more components of the computer system 700 may be used to realize the mobile payment system 200, vending server modules 106a/106b/106/206 and/or mobile payment module 104. The following description of the computing device 700 is provided by way of example only and is not intended to be limiting.

As shown in FIG. 7, the example computing device 700 includes a processor 704 for executing software routines. Although a single processor is shown for the sake of clarity, the computing device 700 may also include a multi-processor system. The processor 704 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a hard disk drive 712 and/or a removable storage drive 714, which may include a magnetic tape drive, an optical disk drive, or the like. The removable storage drive 714 reads from and/or writes to a removable storage unit 718 in a well-known manner. The removable storage unit 718 may include a magnetic tape, optical disk, or the like, which is read by and written to by removable storage drive 714. As will be appreciated by persons skilled in the relevant art(s), the removable storage unit 718 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 720. Examples of a removable storage unit 722 and interface 720 include a program cartridge and cartridge interface (such as that found in video game console devices), a removable memory chip (such as an EPROM or PROM) and associated socket, and other removable storage units 722 and interfaces 720 which allow software and data to be transferred from the removable storage unit 722 to the computer system 700.

The computing device 700 also includes at least one communication interface 724. The communication interface 724 allows software and data to be transferred between computing device 700 and external devices via a communication path 726. In various embodiments of the inventions, the communication interface 724 permits data to be transferred between the computing device 700 and a data communication network, such as a public data or private data communication network. The communication interface 724 may be used to exchange data between different computing devices 700 which such computing devices 700 form part an interconnected computer network. Examples of a communication interface 724 can include a modem, a network interface (such as an Ethernet card), a communication port, an antenna with associated circuitry and the like. The communication interface 724 may be wired or may be wireless. Software and data transferred via the communication interface 724 are in the form of signals which can be electronic, electromagnetic, optical or other signals capable of being received by communication interface 724. These signals are provided to the communication interface via the communication path 726.

As shown in FIG. 7, the computing device 700 further includes a display interface 702 which performs operations for rendering images to an associated display 730 and an audio interface 732 for performing operations for playing audio content via associated speaker(s) 734.

As used herein, the term "computer program product" may refer, in part, to removable storage unit 718, removable storage unit 722, a hard disk installed in hard disk drive 712, or a carrier wave carrying software over communication path 726 (wireless link or cable) to communication interface 724. Computer readable storage media refers to any non-transitory tangible storage medium that provides recorded instructions and/or data to the computing device 700 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 724. Such computer programs, when executed, enable the computing device 700 to perform one or more features of embodiments discussed herein. In various embodiments, the computer programs, when executed, enable the processor 704 to perform features of the above-described embodiments. Accordingly, such computer programs represent controllers of the computer system 700.

Software may be stored in a computer program product and loaded into the computing device 700 using the removable storage drive 714, the hard disk drive 712, or the interface 720. Alternatively, the computer program product may be downloaded to the computer system 700 over the communications path 726. The software, when executed by the processor 704, causes the computing device 700 to perform functions of embodiments described herein.

It is to be understood that the embodiment of FIG. 7 is presented merely by way of example. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A mobile payment system for vending machines, comprising:
a vending server module that is configured to:
generate a unique session identifier in response to receipt of a unique machine identifier associated with a particular vending machine of a plurality of vending machines and a price of a product to be purchased from the particular vending machine;
receive a mobile payment request from a mobile device, the mobile payment request comprising payment credentials, the unique session identifier, the unique machine identifier and the price of the product; and
generate a vending authorization message on a condition that the mobile payment request is approved, the vending authorization message comprising instructions for the particular vending machine to dispense the product.

2. The system as claimed in claim 1, wherein the vending server module is further configured to:
transmit, to a payment server module, the payment credentials for approval of the mobile payment request; and
receive, from the payment server module, a payment approval message on a condition that the mobile payment request is approved.

3. The system as claimed in claim 1, wherein the vending server module is further configured to transmit the generated unique session identifier to the particular vending machine, and wherein the particular vending machine is configured to transmit the unique session identifier, the unique machine identifier and the price of the product to the mobile device such that the mobile device can initiate the mobile payment request.

4. The system as claimed in claim 1, wherein the vending server module is further configured to receive, from the particular vending machine, a vending success message on a condition that the particular vending machine dispenses the product, wherein the vending success message comprises instructions to release funds corresponding to the price of the product.

5. The system as claimed in claim 1, wherein the unique session identifier is associated with a product purchase request that is received at the particular vending machine such that the mobile payment request that is subsequently received at the vending server module from the mobile device can be linked to the product purchase request.

6. The system as claimed in claim 5, wherein the vending server module is further configured to:
receive, from the particular vending machine, information of the product to be purchased and a timestamp corresponding to the product purchase request; and
receive, from the mobile device, the mobile payment request further comprising the information of the product to be purchased and the timestamp corresponding to the product purchase request; and
generate the vending authorization message on a further condition that the information of the product to be purchased and the timestamp corresponding to the product purchase request received from the particular vending machine match the same received from the mobile device.

7. A mobile payment method for vending machines, comprising:
generating, at a vending server module, a unique session identifier in response to receipt of a unique machine identifier associated with a particular vending machine of a plurality of vending machines and a price of a product to be purchased from the particular vending machine;
receiving, at the vending server module, a mobile payment request from a mobile device, the mobile payment request comprising payment credentials, the unique session identifier, the unique machine identifier and the price of the product; and
generating, at the vending server module, a vending authorization message on a condition that the mobile payment request is approved, the vending authorization message comprising instructions for the particular vending machine to dispense the product.

8. The method as claimed in claim 7, further comprising:
transmitting the generated unique session identifier from the vending server module to the particular vending machine; and subsequently
transmitting the unique session identifier, the unique machine identifier and the price of the product from the particular vending machine to the mobile device such that the mobile device can initiate the mobile payment request.

9. The method as claimed in claim 8, wherein the unique session identifier, the unique machine identifier and the price of the product are transmitted from the particular vending machine to the mobile device via Bluetooth Low Energy (BLE) or Near Field Communication (NFC).

10. The method as claimed in claim 7, further comprising transmitting, from the particular vending machine to the vending server module, the unique machine identifier and the price of the product in response to a product purchase request that is received at the particular vending machine.

11. The method as claimed in claim 10, wherein the unique session identifier is associated with the product purchase request that is received at the particular vending machine such that the mobile payment request that is subsequently received at the vending server module from the mobile device can be linked to the product purchase request.

12. The method as claimed in claim 10, further comprising:
receiving, at the vending server module from the particular vending machine, information of the product to be purchased and a timestamp corresponding to the product purchase request;
receiving, at the vending server module from the mobile device, the mobile payment request further comprising the information of the product to be purchased and the timestamp corresponding to the product purchase request; and
generating, at the vending server module, the vending authorization message on a further condition that the information of the product to be purchased and the timestamp corresponding to the product purchase request received from the particular vending machine match the same received from the mobile device.

13. The method as claimed in claim 7, further comprising:
transmitting, from the vending server module to a payment server module, the payment credentials for approval of the mobile payment request; and
receiving, at the vending server module from the payment server module, a payment approval message on a condition that the mobile payment request is approved.

14. The method as claimed in claim 7, further comprising transmitting, from the particular vending machine to the vending server module, a vending success message on a condition that the particular vending machine dispenses the product, wherein the vending success message comprises instructions to release funds corresponding to the price of the product.

15. The method as claimed in claim 7, further comprising:
transmitting the generated unique session identifier from the vending server module to the particular vending machine; and
subsequently displaying, by a display module of the particular vending machine, a machine-readable code comprising the unique session identifier, the unique machine identifier and the price of the product encoded thereon.

16. A vending machine comprising:
a mobile payment module that is configured to:
transmit, to a vending server module, a unique machine identifier associated with the vending machine and a price of a product to be purchased from the vending machine in response to a product purchase request that is received at the vending machine;
receive, from the vending server module, a unique session identifier that is associated with the product purchase request; and
subsequently receive, from the vending server module, a vending authorization message that corresponds to an approved mobile payment request that is linked to the unique session identifier wherein the vending machine is configured to dispense the product to be purchased in response to receipt of the vending authorization message.

17. The vending machine as claimed in claim 16, wherein the mobile payment module is further configured to transmit the unique session identifier, the unique machine identifier and the price of the product to a mobile device such that the mobile device can initiate a mobile payment request.

18. The vending machine as claimed in claim 17, wherein the unique session identifier, the unique machine identifier and the price of the product are transmitted to the mobile device via Bluetooth Low Energy (BLE) or Near Field Communication (NFC).

19. The vending machine as claimed in claim 16, wherein the mobile payment module is further configured to cause a display module of the vending machine to display a machine-readable code comprising the unique session identifier, the unique machine identifier and the price of the product encoded thereon.

20. The vending machine as claimed in claim 16, wherein the mobile payment module is further configured to transmit, to the vending server module, a vending success message on a condition that the vending machine dispenses the product, the vending success message comprising instructions to release funds corresponding to the price of the product.

\* \* \* \* \*